US012743388B2

(12) United States Patent
Huilgol et al.

(10) Patent No.: US 12,743,388 B2
(45) Date of Patent: Sep. 22, 2026

(54) METHOD AND SYSTEM FOR DYNAMIC BUS MANAGEMENT DURING RADIO-FREQUENCY (RF) INTERFERENCE IN A PCB

(71) Applicant: Qualcomm Incorporated, San Diego, CA (US)

(72) Inventors: Supreet Huilgol, Santa Clara, CA (US); Durga Khanal, San Jose, CA (US); Fujuan Guo Lee, San Jose, CA (US); Robert Shen, Saratoga, CA (US); Malcolm Wells, Santa Clara, CA (US); Narmathapriya Subramanian, Dublin, CA (US)

(73) Assignee: Qualcomm Incorporated, San Diego, CA (US)

( * ) Notice: Subject to any disclaimer, the term of this patent is extended or adjusted under 35 U.S.C. 154(b) by 27 days.

(21) Appl. No.: 19/050,854

(22) Filed: Feb. 11, 2025

(65) Prior Publication Data

US 2026/0236415 A1 Aug. 13, 2026

(51) Int. Cl.
*G06F 13/36* (2006.01)

(52) U.S. Cl.
CPC .................................... *G06F 13/36* (2013.01)

(58) Field of Classification Search
None
See application file for complete search history.

(56) References Cited

U.S. PATENT DOCUMENTS

| | | | | |
|---|---|---|---|---|
| 5,862,171 | A * | 1/1999 | Mahany | H04L 1/0071 375/132 |
| 8,855,177 | B1 * | 10/2014 | Wilson | H04B 3/32 375/220 |
| 9,900,852 | B2 * | 2/2018 | Shahar | H04W 52/52 |
| 9,998,160 | B2 * | 6/2018 | Shiu | H04L 27/152 |
| 10,069,576 | B2 * | 9/2018 | Lee | H04B 15/00 |
| 10,965,394 | B1 * | 3/2021 | Eisenman | H04K 3/25 |
| 12,120,164 | B2 * | 10/2024 | Krovvidi | H04L 65/61 |

* cited by examiner

*Primary Examiner* — Elias Mamo
(74) *Attorney, Agent, or Firm* — SMITH TEMPEL BLAHA LLC

(57) ABSTRACT

A system and method for managing a bus system when radio-frequency (RF) interference include a bus diagnostics engine determining when a bus system has been reset a predetermined number of times because RF interference has been detected within the bus system. A dynamic bus manager (DBM) is activated when the bus system has been reset a predetermined number of times because RF interference has been detected within the bus system. The DBM may decrease a speed of the bus system for a first instance once activated. After decreasing the speed of the bus system for the first instance, a bus diagnostics engine (BDE) may determine when the bus system has been reset because RF interference has been detected again. The DBM may decrease the speed of the bus system for a second instance in response to the BDE detecting RF interference after the first instance.

20 Claims, 6 Drawing Sheets

METHOD AND SYSTEM FOR DYNAMIC BUS MANAGEMENT DURING RADIO-FREQUENCY (RF) INTERFERENCE IN A PCB

DESCRIPTION OF THE RELATED ART

A computing device may include multiple subsystems, cores, logic circuitry components, etc. Such a computing device may be, for example, a portable computing device, such as a laptop or palmtop computer, a cellular telephone or smartphone, an Internet-of-Things (IOT) device, a wearable device, an automotive computing device, etc.

These multiple subsystems, cores and other components of a computing device may be included within different chips or in the same integrated circuit chip. A "system-on-chip" or "SoC" is an example of one such chip that integrates numerous components to provide system-level functionality. For example, an SoC may include one or more types of processors, such as central processing units (CPUs), graphics processing units (GPUs), digital signal processors (DSPs), neural processing units (NPUs), etc.

These processors that exist on a single chip and/or on the same printed circuit board (PCB) may be coupled to each other by a common bus. This common bus may transmit its signals according to one or more standards, such as the peripheral component interconnect express (PCIe) known as of this writing. The performance of a bus using PCIe may often be degraded when radio-frequency (RF) interference (i.e. extraneous signals/noise/cross-talk) is generated among its wire/PCB traces. A bus using PCIe may often "reset" when too much RF interference is detected by the bus.

RF interference within a bus that is part of a chip and/or a PCB may be generated by two or more RF transceivers that coexist on the same chip or same PCB. Two RF transceivers that are often placed on the same chip or PCB include, but are not limited to, a WI-FI™ modem and a cellular modem. For example, a portable computing device (PCD), such as a mobile phone, may have these two type of RF transceivers to support communications of the device.

In view of this RF interference, it would be desirable to provide a method and system that may help reduce the impact that RF interference may have on buses using PCIe for PCBs that support communications of PCDs.

SUMMARY OF THE DISCLOSURE

Systems, methods and other examples are disclosed for dynamic bus management during radio-frequency (RF) interference present on a printed circuit board (PCB).

A method for managing a bus system when radio-frequency (RF) interference is detected may include determining by a bus diagnostics engine when a bus system has been reset a predetermined number of times because RF interference has been detected within the bus system. The method may also include activating a dynamic bus manager when the bus system has been reset a predetermined number of times because RF interference has been detected within the bus system.

The method may further include decreasing a speed of the bus system for a first instance by the dynamic bus manager once activated. The method may also include determining by the bus diagnostics engine, after decreasing the speed of the bus system for the first instance, when the bus system has been reset because RF interference has been detected again within the bus system. The method may also include decreasing the speed of the bus system for a second instance by the dynamic bus manager in response to the bus diagnostics engine detecting RF interference after the first instance.

A computer program product comprising a non-transitory computer usable medium having a computer readable program code embodied therein, may include computer readable program code adapted to be executed to implement the method for managing a bus system when radio-frequency (RF) interference is detected, as described above.

A system for managing a bus system when radio-frequency (RF) interference includes a bus diagnostics engine determining when a bus system has been reset a predetermined number of times because RF interference has been detected within the bus system. A dynamic bus manager is activated when the bus system has been reset a predetermined number of times because RF interference has been detected within the bus system.

The dynamic bus manager may decrease a speed of the bus system for a first instance once activated. After decreasing the speed of the bus system for the first instance, the bus diagnostics engine may determine when the bus system has been reset because RF interference has been detected again within the bus system. The dynamic bus manger may decrease the speed of the bus system for a second instance in response to the bus diagnostics engine detecting RF interference after the first instance.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary."

Any aspect described herein as "exemplary" is not necessarily to be construed as preferred or advantageous over other aspects.

The terms "logic" and/or "module," as those terms are used in this disclosure, may denote or describe digital circuits, such as digital gate structures, that are combined and configured in a particular manner to achieve one or more particular functions. For example, a control logic and/or a control module may include a combination of digital circuits that have been combined and configured in a particular manner to achieve one or more particular control functions, either solely in hardware or in a combination of hardware, software and/or firmware.

Figure 1:
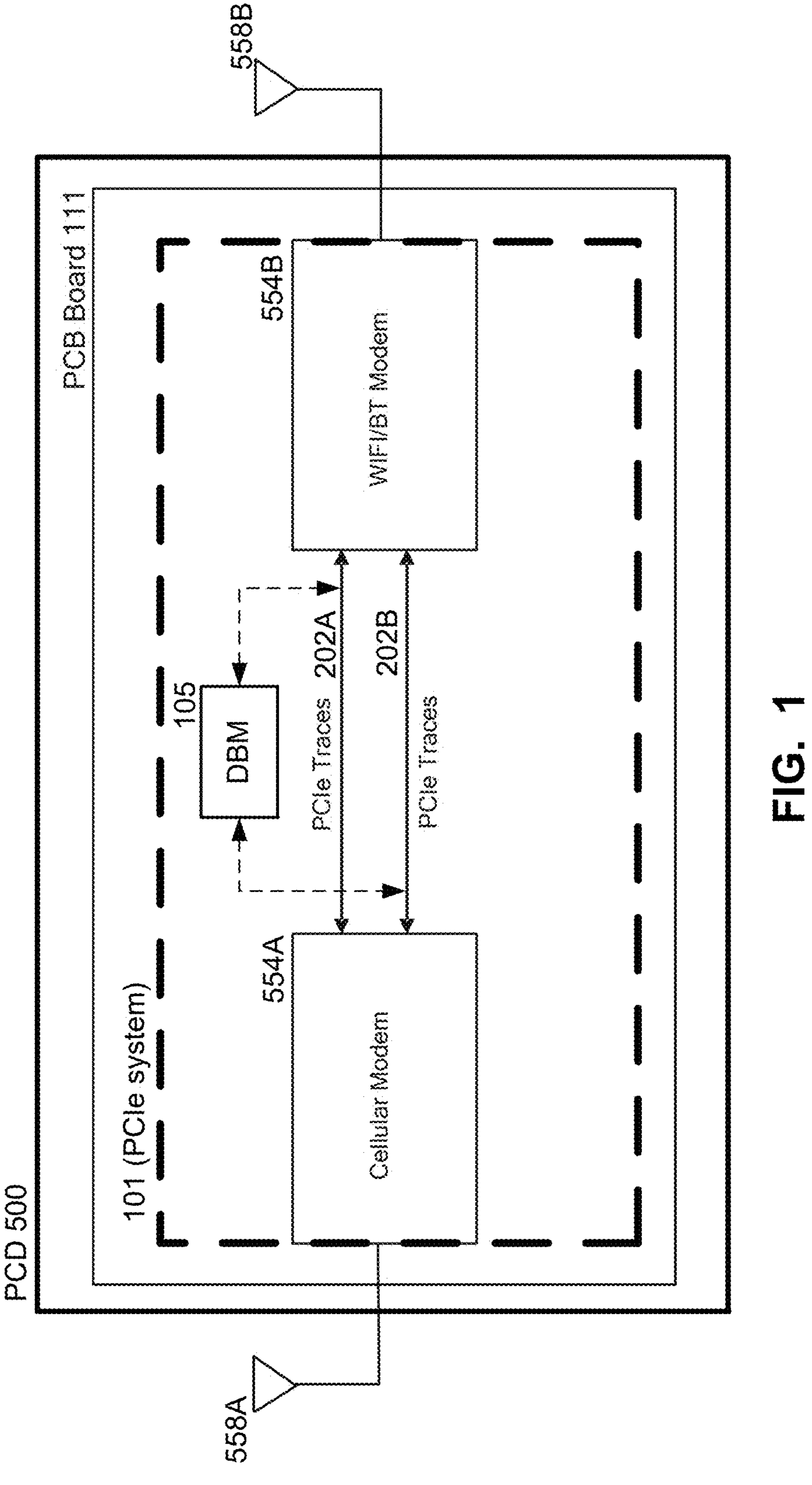
FIG. 1 is a high-level functional block diagram of a bus system for dynamic bus management during radio-frequency (RF) interference present in a printed circuit board (PCB) within a portable computing device (PCD)

Referring now to FIG. 1, this figure is a high-level functional block diagram of a bus system 101 for dynamic bus management during radio-frequency (RF) interference present in a printed circuit board (PCB) 111 within a portable computing device (PCD) 500. As understood by one of ordinary skill in the art, the peripheral component interconnect express (PCIe) serial computer expansion bus standard is used in most electronic devices, as of this writing, which includes, but are not limited to, graphics cards, sound cards, mobile devices, devices that use the WI-FI™ IEE 802.11x wireless communication standard, ethernet, and many other hardware connections. The bus system 101 in FIG. 1 may support and use PCIe for its communications among its endpoints 554 within the bus system 101 that is present within the PCD 500.

The bus system 101 illustrated in FIG. 1 comprises a Dynamic Bus Manager/Module (DBM) 105 which helps track bus/link resets due to RF interference that may be detected in one or more circuit traces/communication lines 202A, 202B. The circuit traces/communication lines 202A, 202B of FIG. 1 form part of the bus/link between endpoints 554A, 554B of the bus system 101.

According to the exemplary embodiment illustrated in FIG. 1, a first bus endpoint 554A may comprise a cellular modem coupled to a first antenna 558A, while the second bus endpoint 554B may comprise a WI-FI™ wireless modem or a Bluetooth™ modem 554B coupled to a second antenna 558B. Further details about modems/endpoints 554A, 554B are described below in connection with FIG. 5.

The circuit traces 202A, 202B as well as the Dynamic Bus Manager/Module (DBM) 105, first and second wireless modems 554A, 554B of the bus system 101 may be provided on a single printed circuit board (PCB) 111. The PCB 111 may be provided in a portable computing device (PCD) 500. The PCD 500 and its technical details are further described below in connection with FIG. 5.

RF interference on the PCB 111 may be generated by the two modems (i.e. two RF transceivers) that coexist on the PCB 111. When the bus system 101, such as a PCIe bus 101, detects too much noise or interference among its circuit traces 202, the bus system 101 may "reset" which causes the system 101 to decrease its bus speed or bus clock frequency to its lowest speed ("L0").

Different generations ("Gen")/versions of the bus system 101 may support a range of bus speeds: Gen1 may operate at about a 1.25 GHz clock frequency/(2.5 Gigabits per second—"Gbps") speed (lowest speed—"L0"); Gen2 may operate at about a 2.50 GHz clock frequency/(5.0 Gbps) speed (intermediate speed—"L1"); Gen3 may operate at about a 4.0 GHz clock frequency/(8 Gbps) speed (intermediate speed—"L2"); and a Gen4 may operate at about a 8.0 GHz clock frequency/(16 Gbps) speed (highest speed—"L5"). However, other clock speeds, additional clock speeds, and other ranges of clock speeds are possible and are included within the scope of this disclosure.

The bus system 101 may increase its bus speed (i.e. the bus clock frequency) following the Gen speeds noted above (i.e. from Gen1 to Gen2, from Gen2 to Gen3 etc.) when the system 101 detects that one or more of it endpoints 554 (i.e. such as first and second modems 554A, 554B) may support the higher Gen bus speeds and when no RF interference is detected within the traces 202. However, when RF interference is detected by the bus system 101 along one or more of its traces 202, the bus system 101 may "reset" the Gen bus speed down to its lowest speed ("L0") to stop the RF interference caused by the higher Gen bus speeds.

The lower Gen speeds (i.e. L0) are usually not as efficient/fast when communicating/transmitting signals over the bus system 101 compared to higher Gen speeds (i.e. L1-L4). Therefore, it is generally desirable to operate the bus system 101 at higher Gen speeds when possible and when no RF interference is detected along the traces 202.

Usually RF interference is generated along traces 202 when the Gen bus speed of the bus system 101 overlaps and/or becomes very close to the frequency of the RF signals generated by the two modems 554A, 554B. This means, generally, there may exist one or more lower Gen bus speeds (i.e. L0-L2, etc.) which may not interfere with the RF signals generated by modems 554A, 554B. That is, higher Gen bus speeds (i.e. L3-L4) may interfere with RF signals generated by modems 554A, 554B while lower Gen bus speeds (i.e. L0-L2) may not interfere with the same RF signals because of the differences in frequencies, as understood by one of ordinary skill in the art.

The Dynamic Bus Manager/Module (DBM) 105 may help the bus system 101 to identify the lower Gen bus speeds (i.e. L0-L2) which may not interfere with the RF signals generated by the modems 554A, 554B. The lower Gen bus speeds (i.e. L0-L2) may prevent the bus system 101 from "resetting" to a lower Gen bus speed (i.e. L0), because the lower Gen bus speeds may not interfere or have frequencies that are close to and/or overlap with the RF signals produced by any transceiver, such as a cellular modem 554A or a WI-FI™/BT modem 554B present within a single PCD 500.

The DBM 105 of FIG. 1 may work in connection/in conjunction with a clock distribution tree 110 (see FIG. 2) to help in identifying additional clock frequencies outside of the Gen bus speeds noted above and to also overcome any RF interference within the traces 202. These additional clock frequencies outside of the Gen bus speeds may also help prevent the bus system 101 from resetting to its lowest Gen bus speed (i.e. L0).

Figure 2:
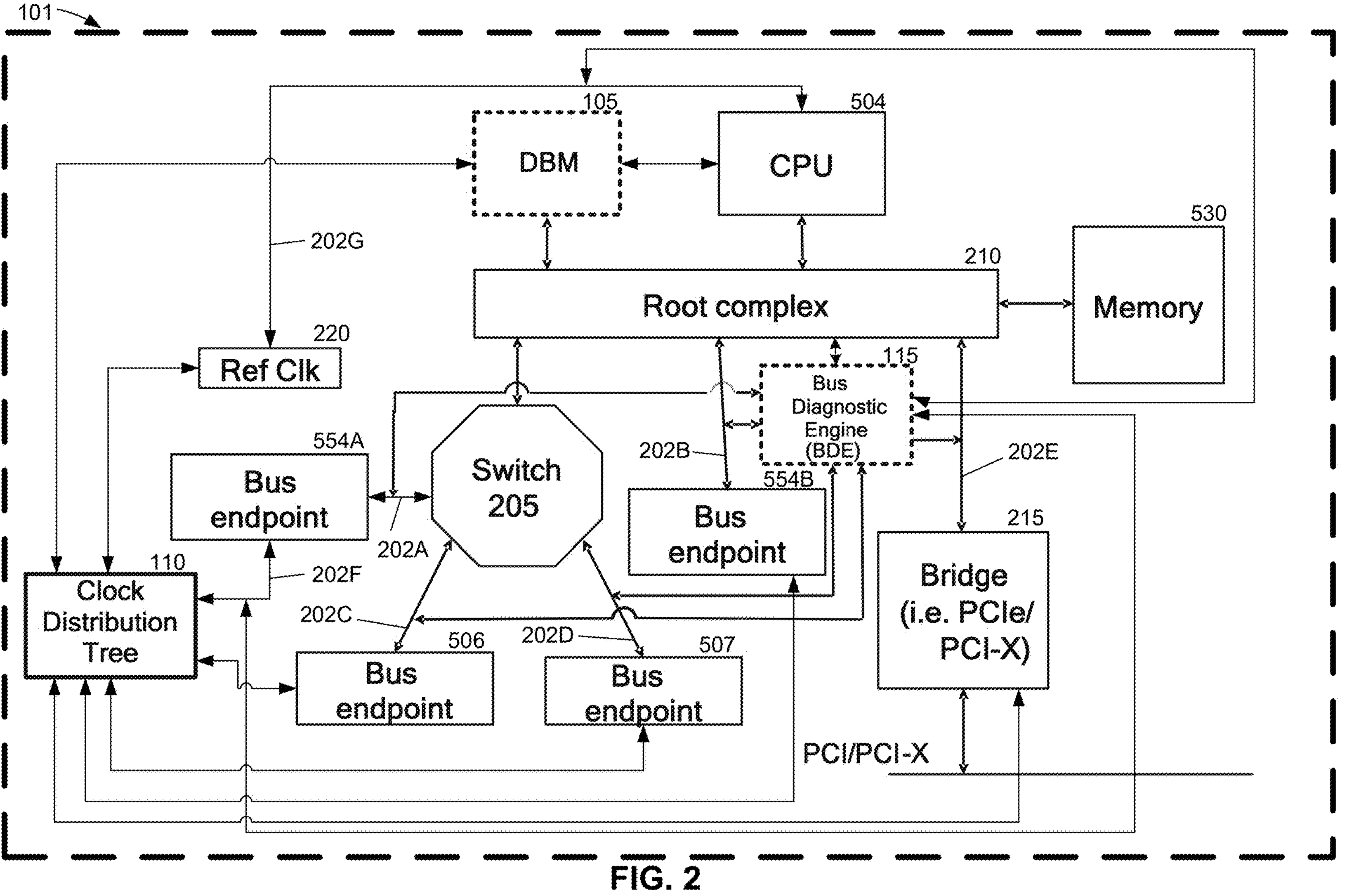
FIG. 2 is a functional block diagram illustrating additional elements of the bus system of FIG. 1 for dynamic bus management during radio-frequency (RF) interference present within a printed circuit board (PCB) or system-on-chip (SoC)
Figure 5:
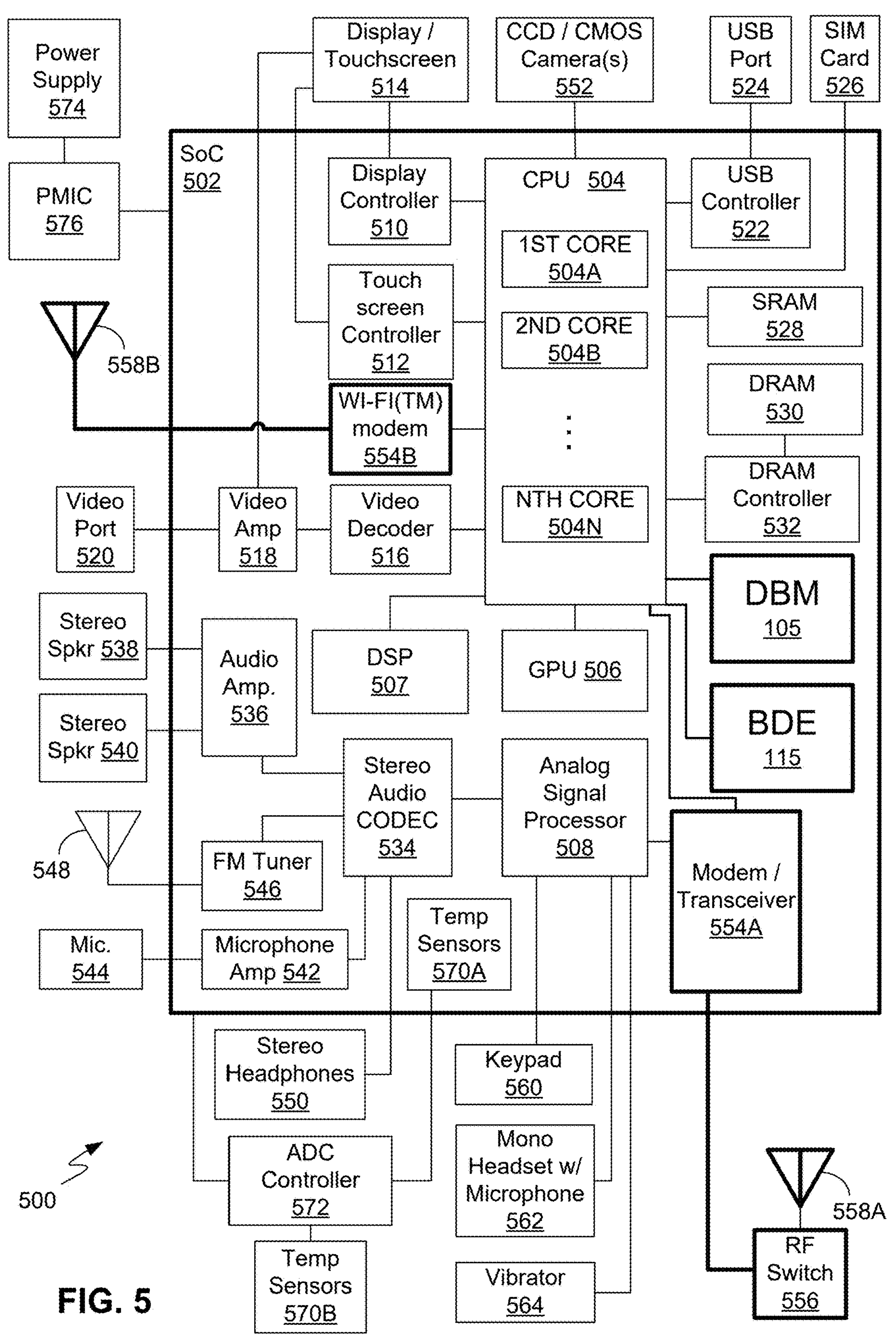
FIG. 5 illustrates details of an exemplary portable computing device (PCD) that was illustrated at a high level in FIG. 1 and which may include two RF transceivers, the dynamic bus manager (DBM) of FIGS. 1-2, and the diagnostics bus engine (DBE) of FIG. 2.

Referring now to FIG. 2, this figure is a functional block diagram illustrating additional elements of the bus system 101 of FIG. 1 for dynamic bus management during radio-frequency (RF) interference present within a printed circuit board (PCB) 111 or SoC 502 (see FIG. 5). Notably, the bus system 101 may comprise the Dynamic Bus Manager/Module 105 of FIG. 1, as well as a clock distribution tree 110, and a Bus Diagnostics Engine (BDE) 115.

The DBM 105 may be coupled to a root complex 210 and a central processing unit (CPU) 504, and a clock distribution tree (CDT) 110. The DBM 105 has been illustrated with dashed lines to indicate this element may comprise software, hardware, firmware, or any combination thereof. According to one exemplary embodiment, the DBM 105 may comprise software that may be executed by the CPU 504.

However, one or more bus endpoints 506, 507, 554A, 554B may also execute DBM 105 when it is provided as software. And according to the exemplary embodiment illustrated in FIGS. 1-2, the DBM 105 works in a bus system 101 that operates in accordance with the PCIe standard described above.

The DBM 105 may decrease or increase the speed of the bus system 101 in predefined or predetermined increments. If the bus system 101 is operating according to the PCIe standard, then the DBM 105 may increase or decrease the speed of the bus system 101 according to the Gen speeds (L0-L4) described previously.

In addition to decreasing or increasing the speed of the bus system 101 according to the Gen speeds (L0-L4), the bus system may 101 also increase or decrease the speed of the bus system 101 by identifying additional clock frequencies outside of the Gen bus speeds noted above by activating a clock distribution tree 110 which is coupled to the reference clock 220. The reference clock 220 is the "main" clock for the bus system 101 and sets the speed of the bus system 101.

The clock distribution tree 110 is usually embodied as hardware and is described in further detail below in connection with FIG. 3. These additional clock frequencies outside of the Gen bus speeds produced by the clock distribution tree 110 may also help prevent the bus system 101 from resetting to its lowest Gen bus speed (i.e. L0).

Figure 4A:
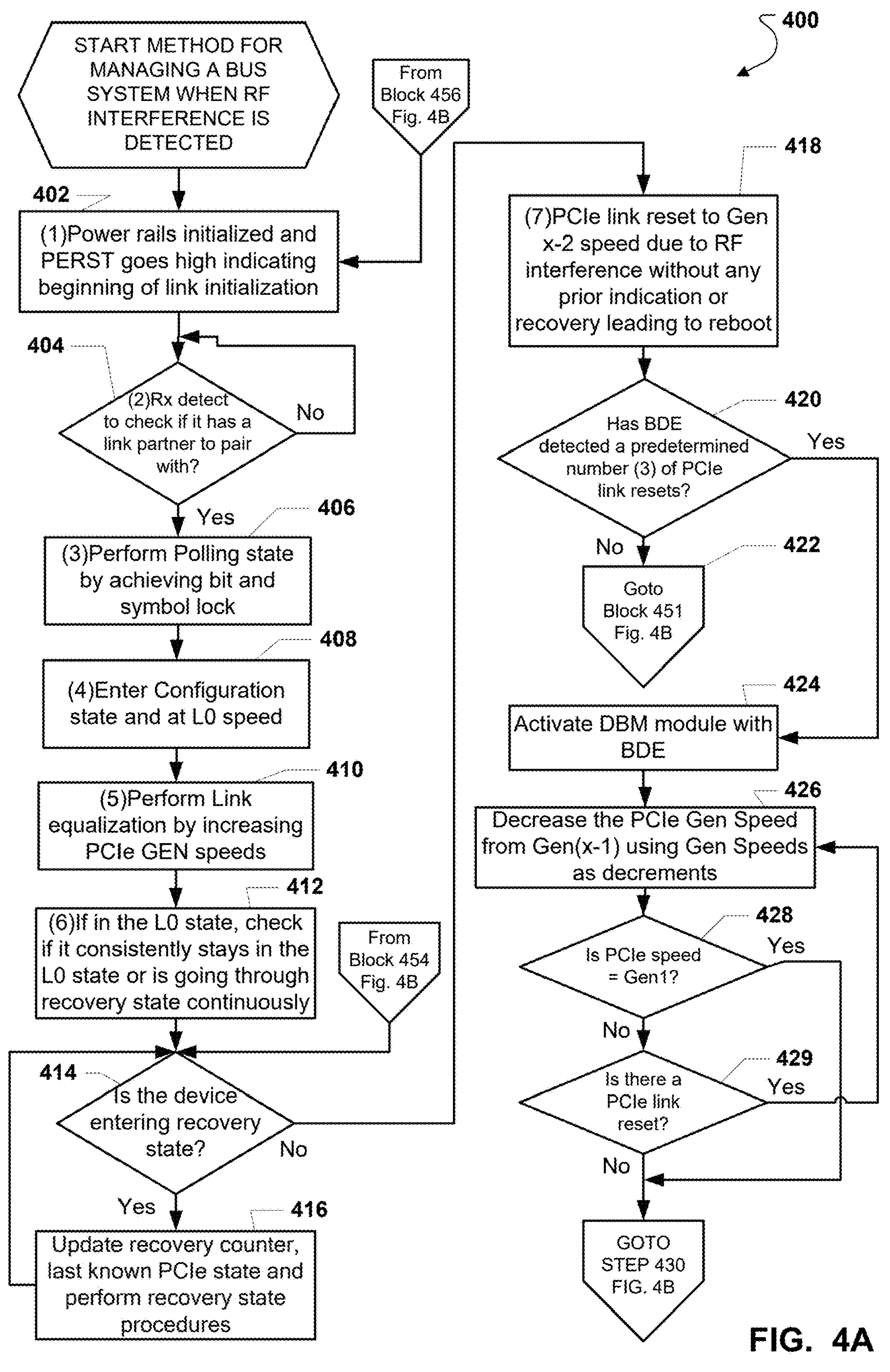
FIG. 4A illustrates a first logical flow chart of a method for managing a bus system when RF interference is detected.
Figure 4B:
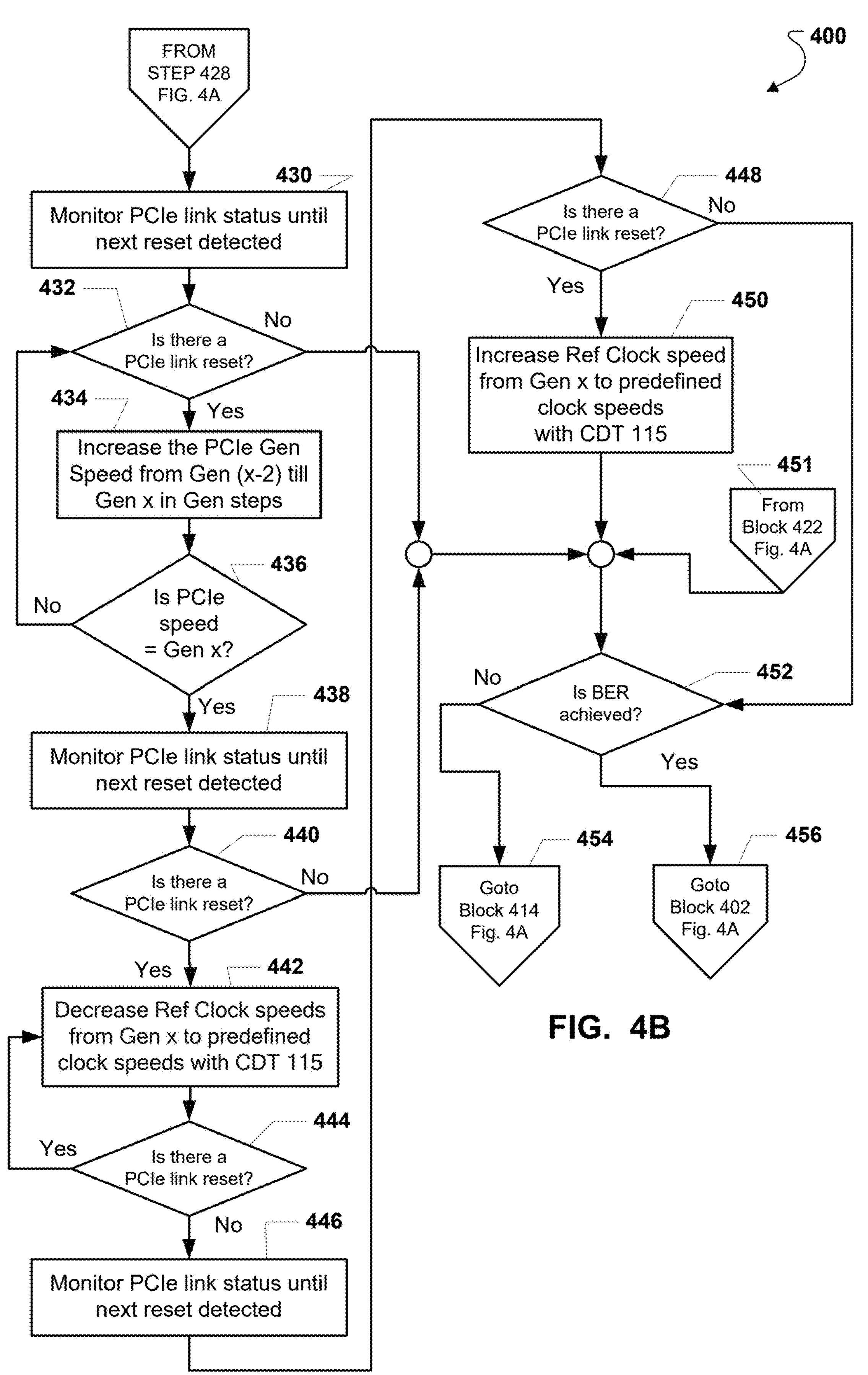
FIG. 4B illustrates a second logical flow chart that is a continuation of the flow chart illustrated in FIG. 4A for the method that manages a bus system when RF interference is detected.

The logic applied by the DBM 105 to determine if the speed of the bus system 101 should be increased or decreased by adjusting Gen speeds OR by creating clock frequencies with the clock distribution tree 110 is illustrated in the logical flow charts of FIGS. 4A-4B. FIGS. 4A-4B are described in detail below.

As mentioned previously, the DBM 105, using the logic of FIGS. 4A-4B, will attempt to determine/find a speed (i.e. clock frequency for the bus system 101) which will not interfere with or receive interference from any RF signals produced by one or more RF transceivers 554A, 554B which may be present within a PCD 101.

The DBM 105 may communicate with the bus diagnostics engine (BDE) 115. Like the DBM 105, the BDE 115 has been illustrated with dashed lines to indicate this element of system 101 may comprise software, hardware, firmware, or any combination thereof. According to one exemplary embodiment, the BDE 115, like the DBM 105, may comprise software that may be executed by the CPU 504.

However, one or more bus endpoints 506, 507, 554A, 554B may also execute BDE 115 when it is provided as software, similar to the DBM 105 described above. And according to the exemplary embodiment illustrated in FIGS. 1-2, the BDE 115 works in a bus system 101 that operates in accordance with the PCIe standard described above.

The BDE 115 may be responsible for detecting whether a communications link along a circuit trace 202 has been re-set by the CPU 504 due to any RF interference detected by the CPU 504 running according to the PCIe standard. When the bus system 101 is running according to PCIe standard, the BDE 115 will monitor each communication line 202 to determine if its communication link has been re-set following PCIe, as understood by one of ordinary skill in the art.

According to one exemplary embodiment, the BDE 115 will track and determine if the bus system 101 has been re-set a threshold or predetermined number of times (i.e. such as, but not limited to, three (3) times) as illustrated in FIGS. 4A-4B and described below. When the bus system 101 has been re-set for the threshold amount or predetermined number of times. the BDE 115 may send a signal to the DBM 105 so that the DBM 105 may increase or decrease the speed of the bus system 101.

The DBM 105 may increase or decrease the speed of the bus system 101 by at least two ways, as noted above: (i) adjusting Gen speeds or (ii) by creating new clock frequencies with the clock distribution tree 110 according to logic illustrated in FIGS. 4A-4B described below.

The BDE 115 is coupled to a root complex device 210. As understood by one of ordinary skill, a root complex device 210 connects the CPU 504 and memory 530 to the bus system 101 that includes the bus endpoints 554A, 554B, 506, 507, switch 205, and bridge 205. When supporting the PCIe bus standard, the root complex device 210 may be referred to as the PCI root bridge 210.

The root complex device 210 may generate transaction requests on behalf of the CPU 504. The root complex device 210 is generally responsible for initiating transactions, managing address spaces, and performing configuration tasks for all devices on the bus system 101.

The root complex device 210 may also be coupled to a switch 205 as well as to a bridge 215. The switch 205 may control/route/multiplex the communications from its three endpoints 506, 507, and 554A that are coupled to the switch 205. The three endpoints 506, 507, 554A may send transmit and receive signals through the switch 205 to/from the root complex device 210.

The bridge 215 may couple the root complex device 210 to legacy devices which may operate at a different protocol than the bus system 101. For example, if the bus system 101 supports a newer PCIe standard, then the bridge 215 may couple/communicate with a legacy device which operates according to an older bus standard or protocol (i.e. such as the older, PCI-X standard, relative to the newer PCIe standard).

The memory 530 coupled to the root complex device 210 may comprise any type of memory. One or more types of memories 530 may include both volatile and non-volatile memories. Examples of volatile memories include static random access memory (SRAM) and dynamic random access memories (DRAM) 530. Such memories may be internal to an SoC 502 (see FIG. 5), as in the case of the DRAM 530.

Figure 3:
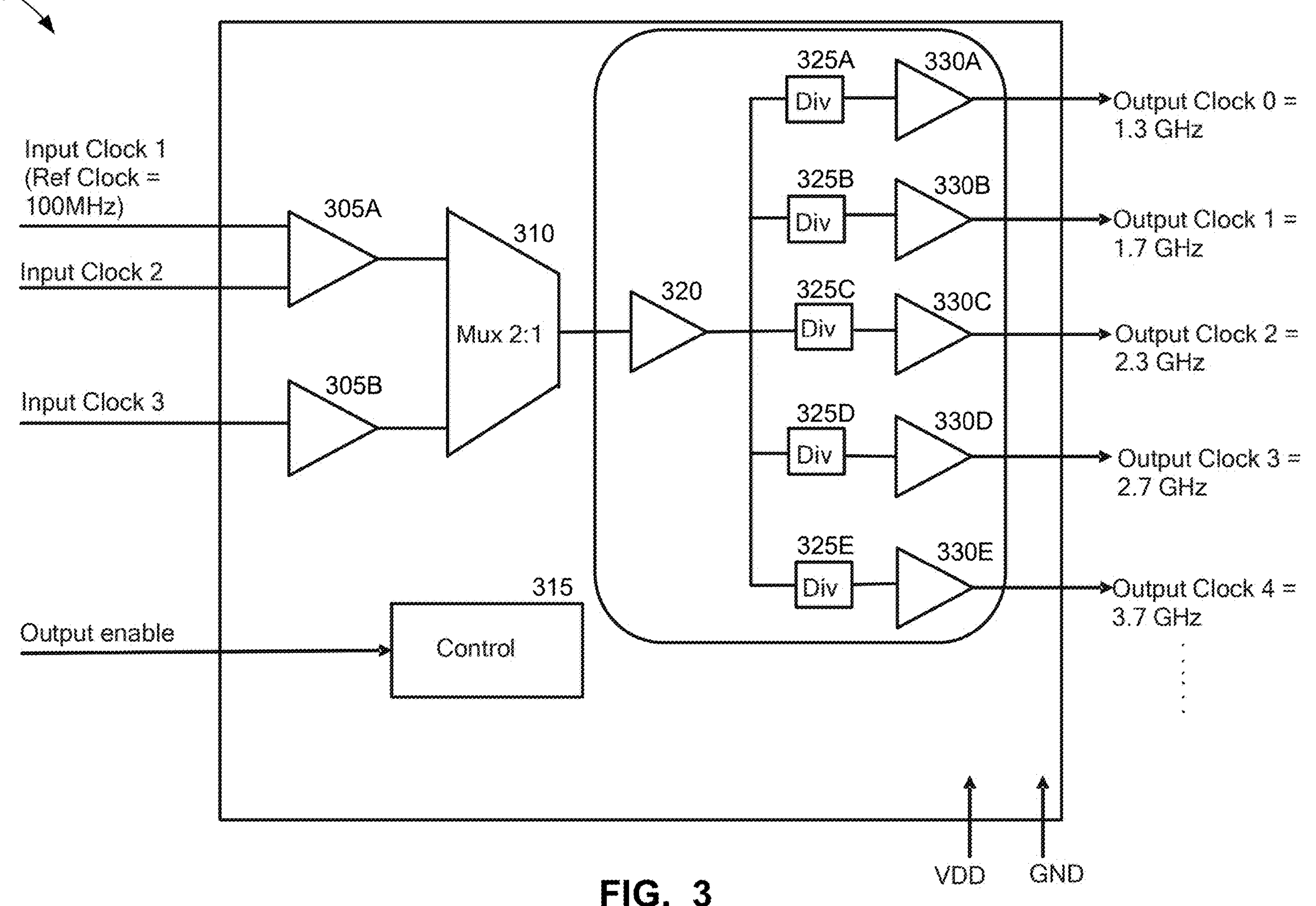
FIG. 3 is a functional block diagram for the clock distribution tree (CDT) illustrated in FIG. 2.

Referring now to FIG. 3, this figure is a functional block diagram for the clock distribution tree (CDT) 110 illustrated in FIG. 2. As described previously, the CDT 110 produces new clock frequencies just outside of the Gen speeds described previously.

The CDT 110 may comprise a first comparator 305A and a second comparator 305B. The first comparator may have as its first input a first input clock signal (Clock 1). According to one exemplary embodiment, the first input signal (Clock 1) may comprise the reference clock frequency that may have a magnitude of about 100.0 MHz. However, other frequencies are possible and are included within the scope of this disclosure.

The second input to the first comparator 305A may comprise a second input clock (Clock 2). Meanwhile, the second comparator may comprise a single first input which may comprise a third input clock (Clock 3). The output of the first and second comparators 305A, 305B may be coupled to a 2:1 multiplexer 310. The output of the 2:1 multiplexer may be coupled to an operational amplifier 320.

The output to the operational amplifier 320 is coupled to at least five dividers 325A-325E, which are in turn, coupled to respective amplifiers 330A-330E. According to one exemplary embodiment, the output of the first through fifth amplifiers (300A-300E) may comprise five new clock signals having the following exemplary five frequencies which are as follows: about 1.3 GHz; about 1.7 GHz; about 2.3

GHz; about 2.7 GHz; and about 3.7 GHz. Other frequencies are possible and are included within the scope of this disclosure.

These five frequencies produced by the CDT 110 are just outside of/different compared to the five Gen speeds mentioned above for the bus system 101, which are again as follows: Gen1 may operate at about a 1.25 GHz clock frequency/(2.5 Gigabits per second—"Gbps") speed (lowest speed—"L0"); Gen2 may operate at about a 2.50 GHz clock frequency/(5.0 Gbps) speed (intermediate speed—"L1"); Gen3 may operate at about a 4.0 GHz clock frequency/(8 Gbps) speed (intermediate speed—"L2"); and a Gen4 may operate at about a 8.0 GHz clock frequency/(16 Gbps) speed (highest speed—"L5").

The CDT 110 may have a control unit 315 which activates or turns on CDT 110. This control unit 315 may be coupled to the DBM 105 which determines if/when the CDT 110 should be activated.

Referring now to FIG. 4A, this figure illustrates a first logical flow chart of a method 400 for managing a bus system 101 when RF interference is detected. The method 400 and bus system 101 may support and operate according to the PCIe standard.

Block 402 is the first step of method 400. As indicated by block 402, power rails that include circuit traces 202 as illustrated in FIGS. 1-2 may be initialized by the CPU 504 and a sideband signal (PCI Express Reset=PERST) may increase in value and indicate the beginning of link initialization for the bus system 101.

Next, as indicated by decision block 404, it may be determined if each end point 506, 507, 554A, 554B has a communications link partner to pair with. Block 404 may be performed and/or controlled by the CPU 504. If the inquiry to decision block 404 is negative, then the "No" branch is followed back to repeat this block 404. If the inquiry to decision block 404 is positive, then the "Yes" branch is followed to block 406.

As indicated by block 406, a polling state is performed for the communication link by achieving a bit and symbol lock. Block 406 may also be performed by or controlled by the CPU 504. Subsequently, as indicated by block 408, the method may include the bus system 101 may entering into a configuration state and may operate at the lowest and/or first Gen speed (i.e. the L0 speed described above). Block 408 may be performed and/or controlled by the CPU 504.

Next, as indicated by block 410, the method 400 may include link equalization by increasing the Gen speed of the bus system 101. If method 400 is supporting the PCIe standard, then block 410 may indicate that the present PCIe Gen speed of the bus system 101 is increased. Block 410 may be performed and/or controlled by the CPU 504.

Subsequently, as indicated in block 412, the method 400 may include determining if the bus system 101 is in its lowest state (i.e. L0—the lowest gen speed), and if the bus system 101 is in its lowest state, then it is determined if the bus system 101 is consistently staying in the lowest state or if the bus system 101 is going through a recovery state continuously (i.e. repeatedly).

As understood by one of ordinary skill in the art, a communication link reset is a more forceful action compared to a recovery state. A communication link reset essentially restarts the communication link between devices connected by the bus system 101 by resetting a state of the communication link to a known default, while a recovery state is a more nuanced process that attempts to re-establish a stable communication link by adjusting parameters and re-training the communication link without a reset, often used to recover from minor errors or link degradation.

There is typically significant data loss with a communication link reset. Meanwhile, there is less or reduced data loss with a communication recovery state compared to a communication link reset. This block 412 for tracking the recovery state may be performed and/or controlled by the CPU 504.

Next, as indicated by decision block 414, the method 400 may further include determining if the bus system 101 is entering into a recovery state after having a communication link issue. This block may be performed by the bus diagnostic engine (BDE) 115 as illustrated in FIG. 2. As noted previously, the BDE 115 has been illustrated with dashed lines to indicate it may comprise software executed by the CPU 504. However, BDE 115 may be implemented as hardware or firmware as understood by one of ordinary skill in the art.

If the inquiry to decision block 410 is positive, then the method 400 may follow the "Yes" branch to block 416. If the inquiry to decision block 410 is negative, then the method 400 may follow "No" branch to block 418.

As shown by block 416, the method 400 may include updating a recovery counter, the state of the bus system 101, and the starting of recovery state procedures for the bus system 101. This block 416 may be performed by the BDE 416. After block 416, the method 400 may return back to the beginning/start of decision block 414.

As indicated by block 418, and due to a "No" decision/condition based on decision block 414, the method 400 may further include resetting the communication links within the bus system 101 due to RF interference detected within traces 202 and where the bus system 101 is set to a Gen x−2 speed (i.e. two generation speeds lower than the present Gen speed).

Specifically, Gen x is the speed at which the bus system 101 is assumed to be currently running/using. A Gen x−2 speed is two Gen speeds lower that the current Gen x speed. For example, if it is assumed that the bus system 101 is presently running at a Gen 5 speed, then x−2 will indicate that the bus system 101 has been re-set to a Gen 3 speed.

This resetting of the communication links within the bus system 101 may occur without any prior indication or recovery and which will usually lead to a complete re-boot of the bus system 101. This block 418 may be performed and/or controlled by the CPU 504.

Next, as indicated by decision block 420, the method 400 may further include determining if the communication links within the bus system 101 have been re-set for a predetermined number of times/instances. According to one exemplary embodiment, the predetermined number of times of communication link resets may comprise a magnitude of three (3) resets. However, other numbers of resets higher or lower are possible and are within the scope of this disclosure as understood by one of ordinary skill in the art.

When bus system 101 is supporting/operating according to the PCIe standard, this block 420 may correspond to the number of PCIe link resets made in the bus system 101 as understood by one of ordinary skill in the art. This block 420 may be performed by the BDE 115 as illustrated in FIG. 2.

If the inquiry to decision block 420 is negative, then the method 400 may follow the "No" branch to connector block 422, in which the method 400 proceeds to connector block 451 in FIG. 4B. From connector block 451 in FIG. 4B, the method 400 proceeds to decision block 452 which will described in further detail below in connection with FIG. 4B.

If the inquiry to decision block 420 of FIG. 4A is positive, then the method 400 follows the "Yes" branch to block 424. As indicated by block 424, the method 400 may further include block 424 in which the dynamic bus manager/module (DBM) 105 described above is activated. In this block, a signal may be sent to the DBM 105 from the BDE 115. This block 424 may be performed and/or controlled by the BDE 115 of FIG. 2.

Next, as shown by block 426, the method 400 may further include decreasing the present speed of the bus system 101 to its next lower speed (X−1, where X is the present/current Gen speed) using the Gen speeds as the size of the speed decreases (i.e. decrements). When the bus system 101 is operating according to the PCIe standard, then this block 426 may correspond with PCIe Gen speeds of the bus system 101 where the present PCIe Gen speed of bus system 101 is decreased to its next lower PCIe Gen speed. This block 426 may be performed and/or controlled by the DBM 105 of FIGS. 1-2.

Subsequently, as indicated by decision block 428, the method 400 may include determining if the present speed of the bus system 101 is at its lowest Gen speed (i.e. Gen 1 speed or its first Gen speed). This decision block 428 may be performed and/or controlled by the DBM 105 of FIGS. 1-2.

If the inquiry to decision block 428 is negative, then method 400 may follow the "No" branch to decision block 429. If the inquiry to decision block 428 is positive, then method 400 may follow the "Yes" branch to block 430 of FIG. 4B.

As indicated by decision block 429, the method 400 may further include determining if any of the communication links supported by the bus system 101 have been re-set due to RF interference. This decision block may be performed and/or controlled by the DBM 105 of FIGS. 1-2. When the bus system 101 is operating according the PCIe standard, then decision block 429 may determine if there has been PCIe communication link reset along one or more of the traces/communication lines 202 as illustrated in FIGS. 1-2.

If the inquiry to decision block 429 is positive, then the method 400 may follow the "Yes" branch back to block 426, where the Gen speed of the bus system 101 is decreased as described previously. If the inquiry to decision block 429 is negative, then the method 400 may follow the "No" branch to block 430 of FIG. 4B which will be described below in connection with FIG. 4B.

Referring now to FIG. 4B, this figure illustrates a second logical flow chart that is a continuation of the flow chart illustrated in FIG. 4A for the method 400 that manages a bus system 101 when RF interference is detected. Block 430 is the first block of the flowchart of FIG. 4B, which is a continuation of the flowchart illustrated in FIG. 4B.

Block 430 continues from the "No" branch of decision block 429 as well as from the "Yes" branch of decision block 428 of FIG. 4A. As indicated by block 430, the method 400 may include monitoring the communications links within the bus system 101 for any communication link resets between bus end points 506, 507, 554A, 554B, and bridge 215. The monitoring of the communication links for resets of block 430 may be performed and/or controlled by the BDE 115 of FIG. 2.

Subsequently, as indicated by decision block 432, the method 400 may further include determining if a communication link reset between one or more bus end points 506, 507, 554A, 554B, and bridge 215 has been detected. This determining of communication link resets of decision block 432 may be performed and/or controlled by the BDE 115 of FIG. 2.

If the inquiry to decision block 432 is positive, then the method 400 may follow the "Yes" branch to block 434. If the inquiry to decision block 432 is negative, then the method 400 may follow the "No" branch to block 451.

As indicated by block 434, the method 400 may include increasing the speed of the bus system 101 from its present speed (which was set to Gen X−2 speed in block 418) to the next two higher Gen speeds. As noted previously, Gen x is the speed at which the bus system 101 is assumed to be currently running/using. A Gen x−2 speed is two Gen speeds lower that the current Gen x speed. For example, if it is assumed that the bus system 101 is presently running at a Gen 5 speed, then x−2 will indicate a Gen 3 speed. As noted previously, the bus speed 101 is generally increased or decreased according the Gen speeds noted above.

Block 434 may further include the BDE 115 sending a signal to the DBM 105 indicating that a communication link has been reset. The increasing of the bus speed of the bus system 101 in block 434 may be performed and/or controlled by the DBM 105 of FIGS. 1-2.

Subsequently, as indicated by decision block 436, the method 400 may further include determining if the present bus speed of the bus system 101 is at the lowest Gen speed of the bus system 101. The determination of whether the present bus speed is at the lowest speed in decision block 436 may be performed and/or controlled by the DBM 105 of FIGS. 1-2.

If the inquiry to decision block 436 is positive, then the method 400 may follow the "Yes" branch to decision block 434. If the inquiry to decision block 436 is negative, then the method 400 may follow the "No" branch back to decision block 432 described above.

As indicated by block 438, which is the same as block 430 described above, the method 400 may include monitoring the communications links within the bus system 101 for any communication link resets between bus end points 506, 507, 554A, 554B, and bridge 215. This monitoring of the communication links for resets of block 438, like block 430, may be performed and/or controlled by the BDE 115 of FIG. 2.

Next, as indicated by decision block 440 (which is the same as decision block 432), the method 400 may further include determining if a communication link reset between one or more bus end points 506, 507, 554A, 554B, and bridge 215 has been detected. This determining of communication link resets of decision block 440 may be performed and/or controlled by the BDE 115 of FIG. 2.

If the inquiry to decision block 440 is positive, then the method 400 may follow the "Yes" branch to block 442. If the inquiry to decision block 440 is negative, then the method 400 may follow the "No" branch to block 452.

Subsequently, as indicated by block 442, the method 400 may include generating additional clock frequencies outside of the Gen bus speeds and that are generally slower/lower than the Gen bus speeds noted above. In a first instance of block 442, the DBM 105 may receive a signal from the BDE 115 that communication reset has occurred and in response to that signal, the DBM 105 may send a signal to activate the CDT 115 to produce the additional clock frequencies illustrated in FIG. 3.

Once the additional clock frequencies are produced by the CDT 115 and in the first instance of block 442, the DBM 105 may set the speed of the bus system 101 (i.e the reference clock 220 of FIG. 2) to the highest speed/highest new additional clock frequency that is produced by CDT 115. In second and later instances of block 442, the DBM 105 may decrease the bus speed of the bus system 101 (i.e. the reference clock 220 of FIG. 2) in single speed decrements according to the new clock frequencies produced by the CDT 115.

Next, in decision block 444 (which is the same as decision blocks 432 & 440), the method 400 may further include determining if a communication link reset between one or more bus end points 506, 507, 554A, 554B, and bridge 215 has been detected. This determining of communication link resets in decision block 444 may be performed and/or controlled by the BDE 115 of FIG. 2.

If the inquiry to decision block 444 is positive, then the method 400 may follow the "Yes" branch back to block 442. If the inquiry to decision block 444 is negative, then the method 400 may follow the "No" branch to block 446.

Subsequently, as indicated in block 446 (which is the same as blocks 430 & 438), the method 400 may include monitoring the communications links within the bus system 101 for any communication link resets between bus end points 506, 507, 554A, 554B, and bridge 215. This monitoring of the communication links for resets of block 446, like blocks 430 & 438, may be performed and/or controlled by the BDE 115 of FIG. 2.

Next, as indicated by decision block 448 (which is the same as decision blocks 432, 440, & 444), the method 400 may further include determining if a communication link reset between one or more bus end points 506, 507, 554A, 554B, and bridge 215 has been detected. This determining of communication link resets of decision block 448 may be performed and/or controlled by the BDE 115 of FIG. 2.

If the inquiry to decision block 448 is positive, then the method 400 may follow the "Yes" branch to block 450. If the inquiry to decision block 448 is negative, then the method 400 may follow the "No" branch to decision block 452.

Next, as indicated by block 450 following a negative output from block 448, the method 400 may include increasing speed of the bus system 101 using the new and predefined/additional clock frequencies produced by the CDT 110 as illustrated in FIG. 3.

The reference clock 220 frequency may be increased in block 450 according to the frequency increments illustrated in FIG. 3. In this block 450, the speed of the bus system 101 is generally increased by one speed relative to the five (5) speeds (i.e. five frequencies) illustrated in FIG. 3. This increase in speed of the bus system 101 of block 450 may be performed and/or controlled by the DBM 105.

Subsequently, as indicated by decision block 452, the method 400 may include determining if an acceptable bit error rate (BER) for the present communication links have been achieved. An acceptable BER according to the PCIe standard may include an error rate of less than 1.0 trillion bits for each communication line 202. The BER determination in block 452 may be performed and/or controlled by the DBM 105.

If the inquiry to decision block 452 is positive, then the method 400 may follow the "Yes" branch to block 456 in which the method returns to block 402 of FIG. 4A described above. If the inquiry to decision block 452 is negative, then the method 400 may follow the "No" branch to block 454 in which the method 400 returns to block 414 of FIG. 4A described above.

Referring now to FIG. 5, this figure illustrates details of an exemplary portable computing device (PCD) 500 that was illustrated at a high level in FIG. 1. The PCD 500 may include two RF transceivers 554A, 554B which may produce RF interference within the bus system 101 (see FIG. 1). The PCD 500 may further include the dynamic bus manager (DBM) of FIGS. 1-2 and the diagnostics bus engine (DBE) of FIG. 2 to mitigate and/or reduce this RF interference.

The PCD 500 may be, for example, a laptop or palmtop computer, cellular telephone or smartphone, personal digital assistant (PDA), navigation device, smartbook, portable game console, satellite telephone, automotive device, Internet-of-Things (IoT) device, etc.

The PCD 500 may include the SoC 502 of FIG. 1. The SoC 502 may include a CPU 504, a GPU 506, a digital signal processor (DSP) 507, an analog signal processor 508, a first RF transceiver that includes a modem/modem subsystem 554A. The PCD 500 may further include a second RF transceiver such as a Wi-Fi™ modem 554B to support an 802.11x wireless communication standard or wireless ethernet. The CPU 504 may include one or more CPU cores, such as a first CPU core 504A, a second CPU core 504B, etc., through an Nth CPU core 504N.

A display controller 510 and a touch-screen controller 512 may be coupled to the CPU 504. A touchscreen display 514 external to the SoC 502 may be coupled to the display controller 510 and the touch-screen controller 512. The PCD 500 may further include a video decoder 516 coupled to the CPU 504. A video amplifier 518 may be coupled to the video decoder 516 and the touchscreen display 514.

A video port 520 may be coupled to the video amplifier 518. A universal serial bus (USB) controller 522 may also be coupled to CPU 504, and a USB port 524 may be coupled to the USB controller 522. A subscriber identity module (SIM) card 526 may also be coupled to the CPU 504.

The CPU 504 may be coupled to one or more memories, with which the CPU 504 or other processors may initiate memory transactions. The one or more memories may include both volatile and non-volatile memories. Examples of volatile memories include static random access memory (SRAM) 528 and dynamic random access memory (DRAM) 530. The DRAM 530 may include a DRAM memory controller 532. Such memories 528, 530 may be internal to the SoC 502, as in the case of the DRAM 530, or external to the SoC 502.

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542.

A frequency modulation (FM) radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 504 include one or more digital (e.g., CCD or CMOS) cameras 552.

The RF transceiver or modem subsystem 554 may be coupled to the analog signal processor 508 and the CPU 504. An RF switch 556 may be coupled to the modem subsystem 554 and an RF antenna 558. In addition, a keypad 560, a mono headset with a microphone 562, and a vibrator device 564 may be coupled to the analog signal processor 508.

The SoC 502 may have one or more internal or on-chip thermal sensors 570A and may be coupled to one or more external or off-chip thermal sensors 570B. An analog-to-digital converter controller 572 may convert voltage drops produced by the thermal sensors 570A and 570B to digital signals.

A power supply 574 and a power management integrated circuit (PMIC) 576 may supply power to the SoC 502. The power supply 574 may comprise a rechargeable battery or a capacitor, or any combination thereof.

As noted previously, the CPU 504 may execute or run a Dynamic Bus Manager/Module (DBM) 105 and a bus diagnostics engine (BDE) 115 which may help the bus system within the PCD 500 to identify the lower Gen bus speeds (i.e. L0-L2) that may not interfere with the RF signals generated by the two modems 554A, 554B. The lower Gen bus speeds (i.e. L0-L2) may prevent the bus system 101 (See FIGS. 1-2) from "resetting" to a lower Gen bus speed (i.e. L0), because the lower Gen bus speeds may not interfere or have frequencies that are close to and/or overlap with the RF signals produced by any RF transceiver, such as a cellular modem 554A or a WI-FI™/BT modem 554B present within a single PCD 500.

As noted above, according to one exemplary embodiment, the DBM 105 and the BDE 115 may comprise software executed by CPU 504. However, the DBM 105 and/or BDE 115 may comprise hardware (H/W), firmware, or any combination thereof.

Implementation examples are described in the following numbered clauses:

1. A method for managing a bus system when radio-frequency (RF) interference is detected, comprising:
   determining by a bus diagnostics engine when a bus system has been reset a predetermined number of times because RF interference has been detected within the bus system;
   activating a dynamic bus manager when the bus system has been reset a predetermined number of times because RF interference has been detected within the bus system;
   decreasing a speed of the bus system for a first instance by the dynamic bus manager once activated;
   after decreasing the speed of the bus system for the first instance, determining by the bus diagnostics engine when the bus system has been reset because RF interference has been detected again within the bus system; and
   decreasing the speed of the bus system for a second instance by the dynamic bus manager in response to the bus diagnostics engine detecting RF interference after the first instance.
2. The method of clause 1, further comprising increasing the speed of the bus system because RF interference has been detected again within the bus system.
3. The method of clauses 1-2, wherein each decrease of speed for the bus system is based on a plurality of predetermined speeds supported by the bus system.
4. The method of clauses 2-3, wherein each decrease of speed and increase in speed for the bus system is based on a plurality of predetermined speeds supported by the bus system.
5. The method of clauses 1-4, wherein the bus system comprises a clock distribution tree, and the method further comprises decreasing the speed of the bus system in accordance with clock frequencies generated by the clock distribution tree.
6. The method of clause 3, wherein the bus system comprises a clock distribution tree, and the method further comprises decreasing the speed of the bus system in accordance with clock frequencies generated by the clock distribution tree.
7. The method of clauses 5-6, wherein the clock frequencies generated by the clock distribution tree are different from the plurality of predetermined speeds supported by the bus system.
8. The method of clauses 1-7, further comprising generating the RF interference with two RF transceivers present within a portable computing device (PCD).
9. The method of clause 8, wherein the PCD comprises at least one of: a laptop or palmtop computer, a cellular telephone or smartphone, a personal digital assistant (PDA), a navigation device, a smartbook computer, a portable game console, a satellite telephone, an automotive device, and an Internet-of-Things (IoT) device.
10. A system for managing a bus system when radio-frequency (RF) interference is detected, comprises:
    a bus diagnostics engine determining when a bus system has been reset a predetermined number of times because RF interference has been detected within the bus system;
    a dynamic bus manager being activated when the bus system has been reset a predetermined number of times because RF interference has been detected within the bus system; the dynamic bus manager decreasing a speed of the bus system for a first instance once activated;
    after decreasing the speed of the bus system for the first instance, the bus diagnostics engine determining when the bus system has been reset because RF interference has been detected again within the bus system; and
    the dynamic bus manger decreasing the speed of the bus system for a second instance in response to the bus diagnostics engine detecting RF interference after the first instance.
11. The system of clause 10, further comprising dynamic bus manager increasing the speed of the bus system because RF interference has been detected again within the bus system.
12. The system of clauses 10-11, wherein each decrease of speed for the bus system is based on a plurality of predetermined speeds supported by the bus system.
13. The system of clauses 11-12, wherein each decrease of speed and increase in speed for the bus system is based on a plurality of predetermined speeds supported by the bus system.
14. The system of clauses 10-13, wherein the bus system comprises a clock distribution tree, and the dynamic bus manager decreases the speed of the bus system in accordance with clock frequencies generated by the clock distribution tree.
15. A computer program product comprising a non-transitory computer usable medium having a computer readable program code embodied therein, said computer readable program code adapted to be executed to implement a method for managing a bus system when radio-frequency (RF) interference is detected, said method comprising:
    determining by a bus diagnostics engine when a bus system has been reset a predetermined number of times because RF interference has been detected within the bus system;
    activating a dynamic bus manager when the bus system has been reset a predetermined number of times because RF interference has been detected within the bus system;
    decreasing a speed of the bus system for a first instance by the dynamic bus manager once activated;

after decreasing the speed of the bus system for the first instance, determining by the bus diagnostics engine when the bus system has been reset because RF interference has been detected again within the bus system; and decreasing the speed of the bus system for a second instance by the dynamic bus manager in response to the bus diagnostics engine detecting RF interference after the first instance.

16. The computer program product of clause 15, wherein the program code implementing the method further comprises increasing the speed of the bus system because RF interference has been detected again within the bus system.

17. The computer program product of clauses 15-16, wherein each decrease of speed for the bus system is based on a plurality of predetermined speeds supported by the bus system.

18. The computer program product of clauses 16-17, wherein each decrease of speed and increase in speed for the bus system is based on a plurality of predetermined speeds supported by the bus system.

19. The computer program product of clauses 15-18, wherein the bus system comprises a clock distribution tree, and the method further comprises decreasing the speed of the bus system in accordance with clock frequencies generated by the clock distribution tree.

20. The computer program product of clause 19, wherein the clock frequencies generated by the clock distribution tree are different from the plurality of predetermined speeds supported by the bus system.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for managing a bus system when radio-frequency (RF) interference is detected, comprising:

determining by a bus diagnostics engine when a bus system has been reset a predetermined number of times because RF interference has been detected within the bus system;

activating a dynamic bus manager when the bus system has been reset a predetermined number of times because RF interference has been detected within the bus system;

decreasing a speed of the bus system for a first instance by the dynamic bus manager once activated;

after decreasing the speed of the bus system for the first instance, determining by the bus diagnostics engine when the bus system has been reset because RF interference has been detected again within the bus system; and decreasing the speed of the bus system for a second instance by the dynamic bus manager in response to the bus diagnostics engine detecting RF interference after the first instance.

2. The method of claim 1, further comprising increasing the speed of the bus system because RF interference has been detected again within the bus system.

3. The method of claim 1, wherein each decrease of speed for the bus system is based on a plurality of predetermined speeds supported by the bus system.

4. The method of claim 2, wherein each decrease of speed and increase in speed for the bus system is based on a plurality of predetermined speeds supported by the bus system.

5. The method of claim 1, wherein the bus system comprises a clock distribution tree, and the method further comprises decreasing the speed of the bus system in accordance with clock frequencies generated by the clock distribution tree.

6. The method of claim 3, wherein the bus system comprises a clock distribution tree, and the method further comprises decreasing the speed of the bus system in accordance with clock frequencies generated by the clock distribution tree.

7. The method of claim 6, wherein the clock frequencies generated by the clock distribution tree are different from the plurality of predetermined speeds supported by the bus system.

8. The method of claim 1, further comprising generating the RF interference with two RF transceivers present within a portable computing device (PCD).

9. The method of claim 8, wherein the PCD comprises at least one of: a laptop or palmtop computer, a cellular telephone or smartphone, a personal digital assistant (PDA), a navigation device, a smartbook computer, a portable game console, a satellite telephone, an automotive device, and an Internet-of-Things (IoT) device.

10. A system for managing a bus system when radio-frequency (RF) interference is detected, comprises:

a bus diagnostics engine determining when a bus system has been reset a predetermined number of times because RF interference has been detected within the bus system;

a dynamic bus manager being activated when the bus system has been reset a predetermined number of times because RF interference has been detected within the bus system; the dynamic bus manager decreasing a speed of the bus system for a first instance once activated;

after decreasing the speed of the bus system for the first instance, the bus diagnostics engine determining when the bus system has been reset because RF interference has been detected again within the bus system; and the dynamic bus manger decreasing the speed of the bus system for a second instance in response to the bus diagnostics engine detecting RF interference after the first instance.

11. The system of claim 10, further comprising dynamic bus manager increasing the speed of the bus system because RF interference has been detected again within the bus system.

12. The system of claim 10, wherein each decrease of speed for the bus system is based on a plurality of predetermined speeds supported by the bus system.

13. The system of claim 11, wherein each decrease of speed and increase in speed for the bus system is based on a plurality of predetermined speeds supported by the bus system.

14. The system of claim 10, wherein the bus system comprises a clock distribution tree, and the dynamic bus manager decreases the speed of the bus system in accordance with clock frequencies generated by the clock distribution tree.

15. A computer program product comprising a non-transitory computer usable medium having a computer readable program code embodied therein, said computer readable program code adapted to be executed to implement a method for managing a bus system when radio-frequency (RF) interference is detected, said method comprising:

determining by a bus diagnostics engine when a bus system has been reset a predetermined number of times because RF interference has been detected within the bus system;

activating a dynamic bus manager when the bus system has been reset a predetermined number of times because RF interference has been detected within the bus system;

decreasing a speed of the bus system for a first instance by the dynamic bus manager once activated;

after decreasing the speed of the bus system for the first instance, determining by the bus diagnostics engine when the bus system has been reset because RF interference has been detected again within the bus system; and decreasing the speed of the bus system for a second instance by the dynamic bus manager in response to the bus diagnostics engine detecting RF interference after the first instance.

16. The computer program product of claim 15, wherein the program code implementing the method further comprises increasing the speed of the bus system because RF interference has been detected again within the bus system.

17. The computer program product of claim 15, wherein each decrease of speed for the bus system is based on a plurality of predetermined speeds supported by the bus system.

18. The computer program product of claim 16, wherein each decrease of speed and increase in speed for the bus system is based on a plurality of predetermined speeds supported by the bus system.

19. The computer program product of claim 15, wherein the bus system comprises a clock distribution tree, and the method further comprises decreasing the speed of the bus system in accordance with clock frequencies generated by the clock distribution tree.

20. The computer program product of claim 19, wherein the clock frequencies generated by the clock distribution tree are different from the plurality of predetermined speeds supported by the bus system.

* * * * *